US007986381B2

United States Patent
Park et al.

(10) Patent No.: US 7,986,381 B2
(45) Date of Patent: *Jul. 26, 2011

(54) ARRAY SUBSTRATE FOR A LIQUID CRYSTAL DISPLAY DEVICE AND METHOD OF MANUFACTURING THE SAME

(75) Inventors: Dae-Lim Park, Gyeongsangbuk-do (KR); Seong-Soo Hwang, Gumi-si (KR); Young-Sik Kim, Gyeongsangbuk-do (KR); Soo-Hwan Moon, Gumi-si (KR)

(73) Assignee: LG Display Co, Ltd., Seoul (KR)

( * ) Notice: Subject to any disclaimer, the term of this patent is extended or adjusted under 35 U.S.C. 154(b) by 701 days.

This patent is subject to a terminal disclaimer.

(21) Appl. No.: 12/068,235

(22) Filed: Feb. 4, 2008

(65) Prior Publication Data

US 2008/0211982 A1      Sep. 4, 2008

Related U.S. Application Data

(62) Division of application No. 10/736,571, filed on Dec. 17, 2003, now Pat. No. 7,349,038.

(30) Foreign Application Priority Data

Dec. 23, 2002   (KR) .................. 10-2002-0082730

(51) Int. Cl.
*G02F 1/136* (2006.01)
(52) U.S. Cl. ......................................................... 349/43
(58) Field of Classification Search .................... 349/43
See application file for complete search history.

(56) References Cited

U.S. PATENT DOCUMENTS

| 6,559,920 B1 | 5/2003 | Ahn et al. |
| 2001/0035920 A1 | 11/2001 | Choi |
| 2002/0024622 A1 | 2/2002 | Murade |

*Primary Examiner* — James Dudek
(74) *Attorney, Agent, or Firm* — McKenna Long & Aldridge LLP

(57) ABSTRACT

An array substrate for a liquid crystal display device includes a substrate, a gate line elongated in one direction, a data line crossing over the gate line, a thin film transistor near a crossing point of the gate and data lines and connected to the gate and data lines, an independent portion under the data line at the crossing point, the portion being separated from the gate line, and a pixel electrode connected to the thin film transistor. The independent portion may be inside the gate line. The parasitic capacitor between the gate line and the data line can be reduced and the amount of light from the backlight device can be reduced.

8 Claims, 7 Drawing Sheets

ARRAY SUBSTRATE FOR A LIQUID CRYSTAL DISPLAY DEVICE AND METHOD OF MANUFACTURING THE SAME

This application is a divisional application of application Ser. No. 10/736,571 filed Dec. 17, 2003 now U.S. Pat. No. 7,349,038 which claims the benefit of Korean Patent Application No. 10-2002-0082730 filed Dec. 23, 2002 which are hereby incorporated by reference for all purposes as if fully set forth herein.

BACKGROUND OF THE INVENTION

1. Field of the Invention

The present invention relates to an array substrate for a liquid crystal display (LCD) device and more particularly, to an array substrate having gate and data lines and a manufacturing method thereof.

2. Discussion of the Related Art

Generally, a liquid crystal display (LCD) device includes two substrates that are spaced apart and face each other with a liquid crystal material layer interposed between the two substrates. Each of the substrates includes electrodes that face each other, wherein a voltage applied to each electrode induces an electric field between the electrodes and within the liquid crystal material layer. An intensity or direction of the applied electric field affects alignment of the liquid crystal molecules of the liquid crystal material layer. Accordingly, the LCD device displays an image by varying light transmissivity through the liquid crystal material layer in accordance with the arrangement of the liquid crystal molecules.

FIG. 1 is an enlarged perspective view of a liquid crystal display (LCD) device according to the related art. In FIG. 1, an LCD device 11 has upper and lower substrates 5 and 22, which are spaced apart from and facing each other, and a liquid crystal material layer 14 interposed between the upper and lower substrates 5 and 22. The upper substrate 5 includes a black matrix 6, a color filter layer 8, and a transparent common electrode 18 subsequently disposed on an interior surface thereof. The black matrix 6 includes openings having one of three sub-color filters of red (R), green (G), and blue (B).

A gate line 13 and a data line 15 are formed on an interior surface of the lower substrate 22, which is commonly referred to as an array substrate, such that the gate line 13 and the date line 15 cross each other to define a pixel area P. In addition, a thin film transistor T is formed at the crossing of the gate line 13 and the data line 15 and includes a gate electrode, a source electrode, and a drain electrode. A pixel electrode 17 is formed within the pixel area P to correspond to the sub-color filters (R), (G), and (B), and is electrically connected to the thin film transistor T. The pixel electrode 17 is made of a light transparent conductive material, such as indium-tin-oxide (ITO).

A storage capacitor C is connected to the pixel electrode 17. The gate line 13 acts as a first capacitor electrode and a metal layer 30 acts as a second capacitor electrode that is connected to the pixel electrode 17. The metal layer 30 is formed when source and drain electrodes for the thin film transistor T are formed.

A scanning pulse is supplied to the gate electrode of the thin film transistor T along the gate line 13, and a data signal is supplied to the source electrode of the thin film transistor T along the data line 15. Accordingly, light transmission through the liquid crystal material layer 14 is adjusted by controlling electrical and optical properties of the liquid crystal material layer 14. For example, the liquid crystal material layer 14 includes a dielectric anisotropic material having spontaneous polarization properties such that the liquid crystal molecules form a dipole when the electric field is induced. Thus, the liquid crystal molecules of the liquid crystal material layer 14 are controlled by the applied electric field. In addition, optical modulation of the liquid crystal material layer 14 is adjusted according to the arrangement of the liquid crystal molecules. Therefore, images on the LCD device are produced by controlling light transmittance of the liquid crystal material layer 14 by optical modulation of the liquid crystal material layer 14.

Detailed description of the pixel area P is explained with reference to FIG. 2 which is an enlarged plan view of an array substrate for an LCD device according to the related art. Gate lines 52 and data lines 66 are formed on a substrate 50 to cross each other, thereby defining pixel areas P.

A thin film transistor T is formed at the crossing of each of the gate and data lines 52 and 66 to function as a switching element. The thin film transistor T includes a gate electrode 54 that is connected to the gate line 52 to receive scanning signals, a source electrode 62 that is connected to the data line 66 and receives data signals, and a drain electrode 64 that is spaced apart from the source electrode 62. In addition, the thin film transistor T includes an active layer 76 between the gate electrode 52 and the source and drain electrodes 62 and 64. A transparent pixel electrode 70 is formed in the pixel area P and is connected to the drain electrode 64. The pixel electrode 70 is connected to a metal layer 78 and forms a storage capacitor C.

In addition, with reference to FIG. 3, at a crossing area E between the gate and data lines 52 and 66 there is a parasitic capacitor, wherein the gate line 52 and the data line 66 act as capacitor electrodes and the gate insulating layer 56 acts as a dielectric layer. The parasitic capacitor deteriorates the electric characteristic of the LCD device.

Thus, an improved structure of the array substrate is shown in FIG. 4. At the crossing area E a portion 106 of the gate line is cut away, and the area of the gate line under the data line become smaller. Thus, the capacitance of the parasitic capacitor is reduced.

Furthermore, there is an open portion or cutaway portion 106, through which light from a back light device can be emitted and be reflected against the data line. The transmitted and reflected light can reach the active layer of the thin film transistor T, thus deteriorating the electric characteristic of the thin film transistor.

SUMMARY OF THE INVENTION

The present invention is directed to an array substrate for a liquid crystal display device and a manufacturing method thereof that substantially obviates one or more problems due to limitations and disadvantages of the related art.

An advantage of the present invention is to provide an array substrate for a liquid crystal display device and a manufacturing method thereof that reduces the influence of the parasitic capacitor at the crossing area of the gate and data lines.

Another advantage of the present invention is to provide an array substrate for a liquid crystal display device and a manufacturing method thereof that reduces the influence of light from the backlight device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a substrate, a gate line elongated in one direction, a data line crossing over the gate line, a thin film transistor near a crossing point of the gate and data lines and connected to the gate and data lines, an independent portion under the data line at the crossing point, the independent portion being separated from the gate line, and a pixel electrode connected to the thin film transistor. The independent portion may be inside the gate line.

In another aspect of the present invention, a manufacturing method of an array substrate for a liquid crystal display device, includes forming a gate line on a substrate; forming a data line crossing over the gate line; forming an independent portion under the data line at a crossing point of the gate and data lines, the portion being separated from the gate line; forming a thin film transistor near the crossing point of the gate and data lines and connected to the gate and data lines; and forming a pixel electrode connected to the thin film transistor. The independent portion is formed when the gate line is formed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiment of the present invention, which are illustrated in the accompanying drawings.

Figure 1:
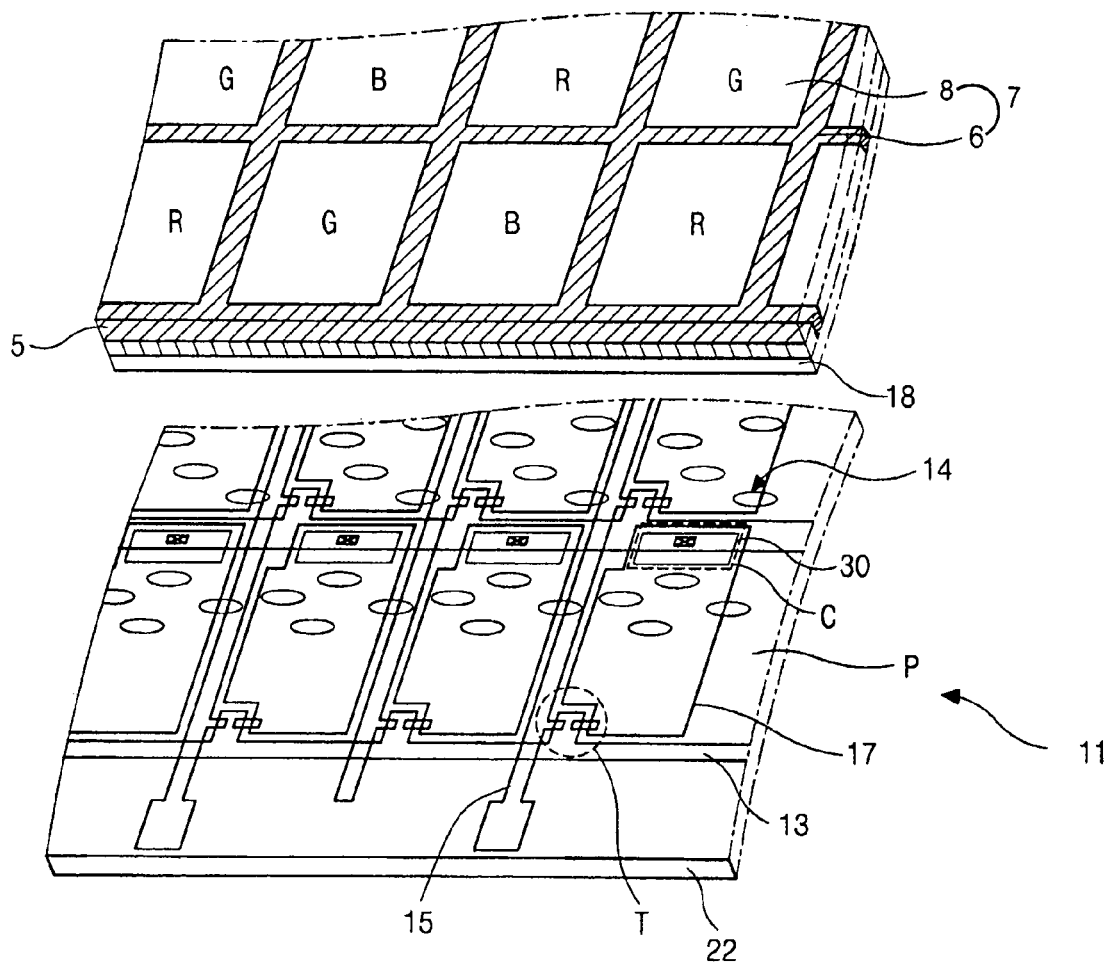
FIG. 1 is an enlarged perspective view of a liquid crystal display (LCD) device according to the related art.
Figure 2:
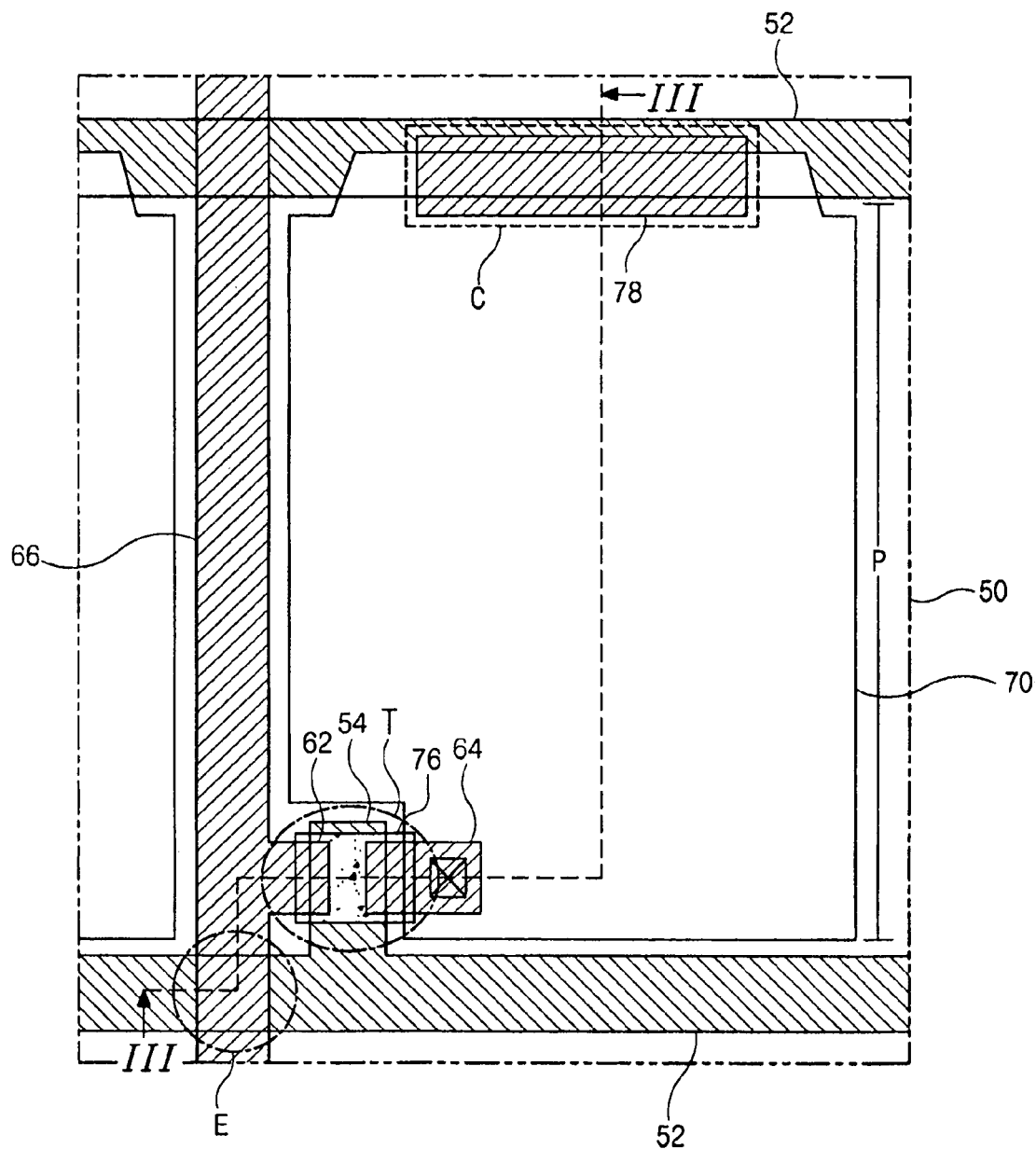
FIG. 2 is an enlarged plan view of an array substrate for an LCD device according to the related art.
Figure 3:
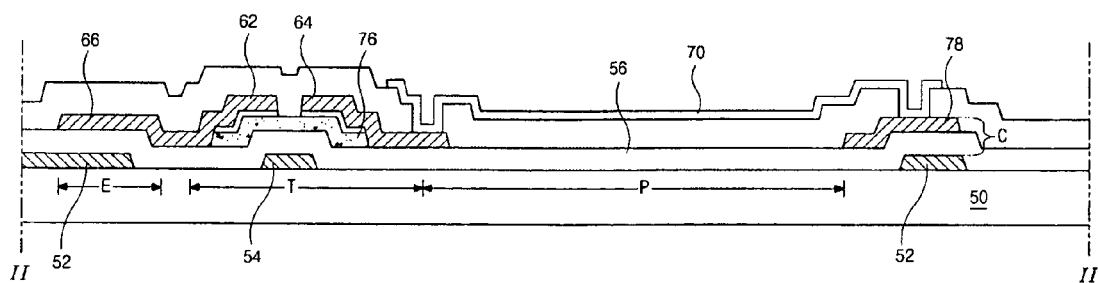
FIG. 3 is a sectional view along line III-III of FIG. 2.
Figure 4:
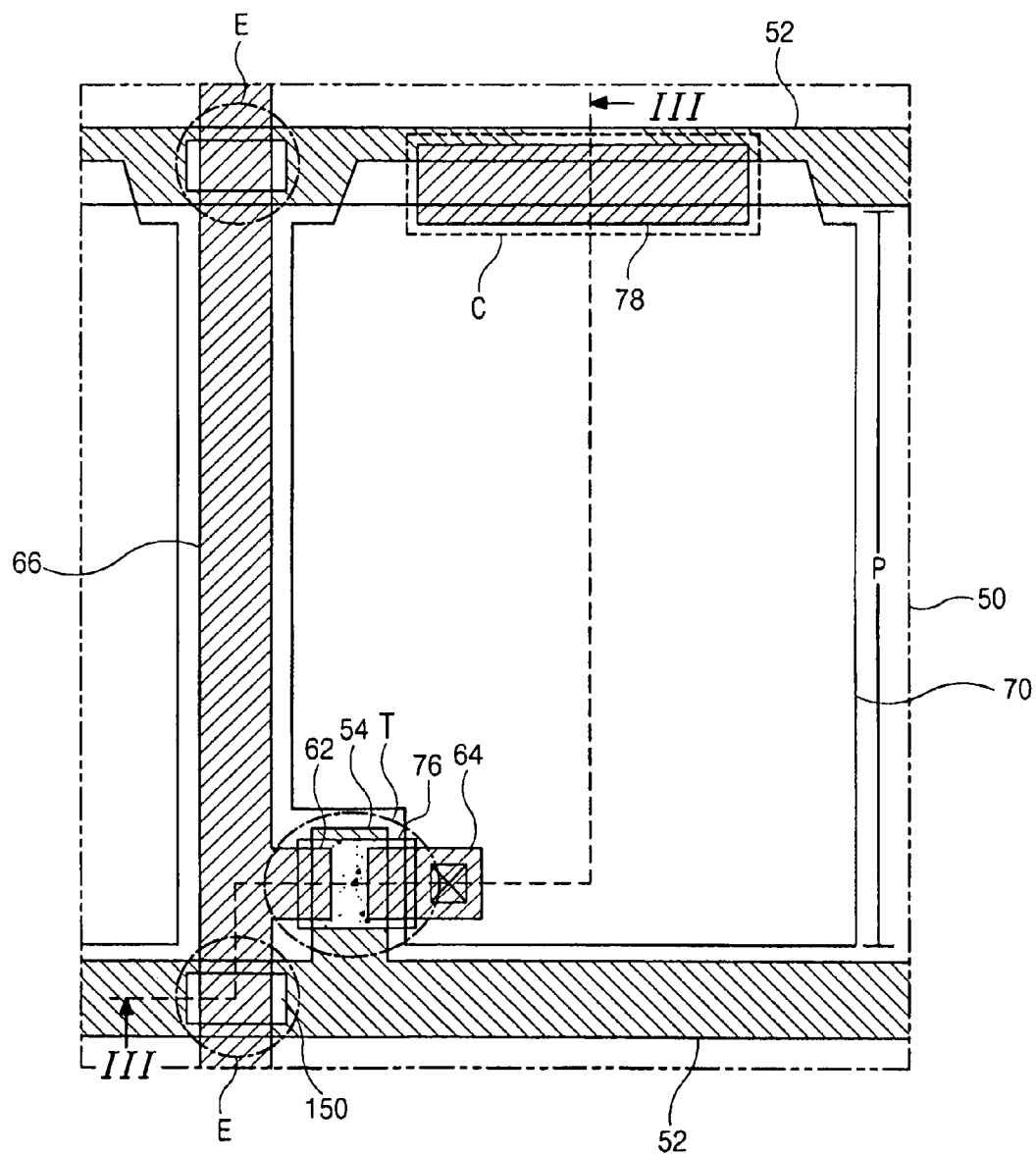
FIG. 4 is a similar view to FIG. 2 according to the related art.
Figure 5:
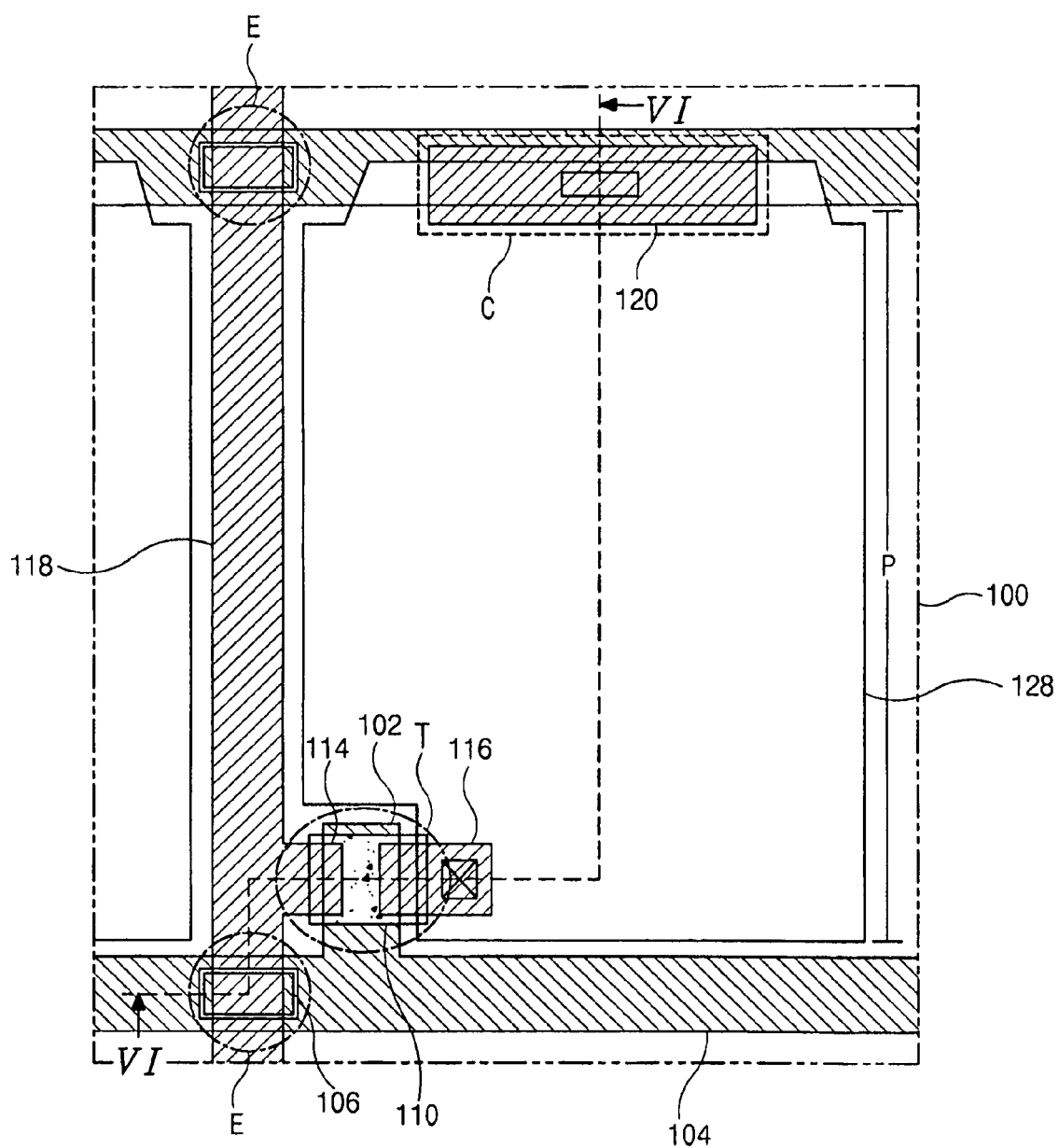
FIG. 5 is a similar view to FIG. 3 according to the present invention.

FIG. 5 is a similar view to FIG. 4. Gate lines 104 and data lines 118 are formed on a substrate 100 to cross each other, thereby defining pixel areas P.

A thin film transistor T is formed at the crossing of each of the gate and data lines 104 and 118 to function as a switching element. The thin film transistor T includes a gate electrode 102 that is connected to the gate line 104 to receive scanning signals, a source electrode 114 that is connected to the data line 118 and receives data signals, and a drain electrode 116 that is spaced apart from the source electrode 114. In addition, the thin film transistor T includes an active layer 110 between the gate electrode 102 and the source and drain electrodes 114 and 116, and a transparent pixel electrode 128 which is formed in the pixel area P and is connected to the drain electrode 116. The pixel electrode 128 is connected to a metal layer 120 and forms a storage capacitor C.

The only difference is that the gate line 104 has an independent portion 106 inside the gate line 104. The isolated portion 106 is not connected to the gate line 106, and thus, no electric signal is applied to the portion 106. Therefore, the parasitic capacitor at the crossing point E can be reduced as much as that shown in FIG. 4. But, the space through which light from a back light device (not shown) can transmit is much more reduced.

FIG. 6A to 6D are cross sectional views of a manufacturing method of the array substrate along VI-VI of FIG. 5 according to an embodiment of the present invention.

Figure 6A:
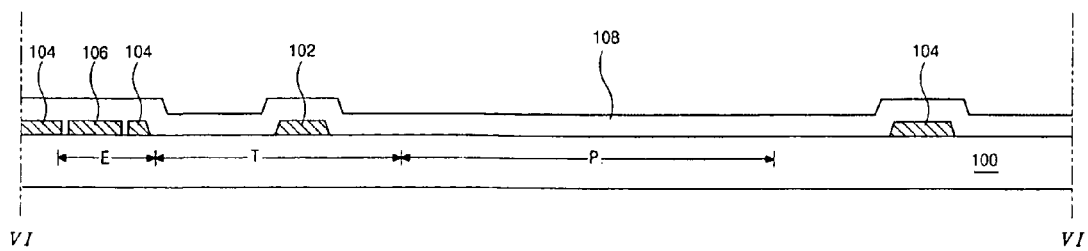
FIGS. 6A to 6D are cross sectional views of a manufacturing method of the array substrate along line VI-VI of FIG. 5 according to the present invention.

First, a switching area T, a pixel area P, and a crossing point E are defined on a substrate 100. As shown in FIG. 6A, on the substrate 100, a first metal layer is formed by a sputtering method and patterned using a photolithography method to form the gate line 104, the gate electrode 102, and the independent portion 106. As shown in FIG. 5, the gate electrode 102 is formed in a switching area T and connected to the gate line 104, whereas the independent portion is positioned inside the gate line 104. Though the independent portion 106 should not be connected to the gate line 104, the gap between the gate line 104 and the independent portion 106 is reduced to be as small as possible, since through the gap light can be transmitted. Then a gate insulating layer 108 is formed. The material for the gate insulating layer 108 is selected from among non-organic material such as silicon nitride or silicon oxide.

Figure 6B:
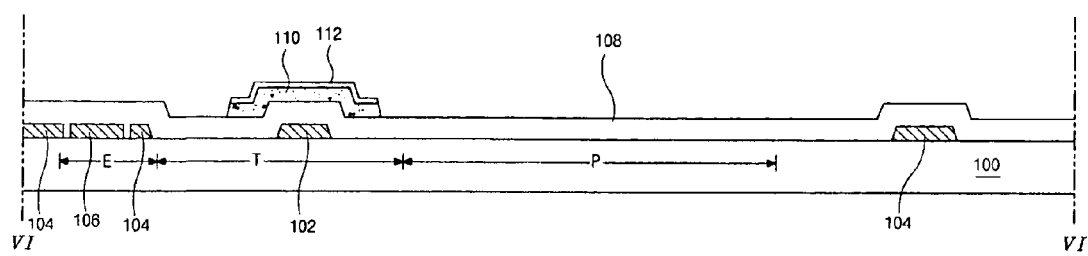

Next, as shown in FIG. 6B on the gate insulating layer 108, an amorphous silicon layer and a doped amorphous silicon layer are formed and patterned into an active layer 110 and an ohmic contact layer 112, respectively.

Figure 6C:
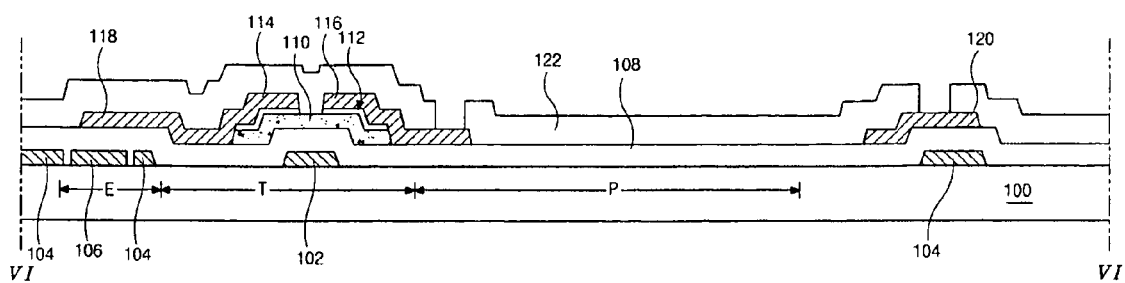

After forming the ohmic contact layer 112, as shown in FIG. 6C, a second metal layer is formed and patterned to form source and drain electrodes 114 and 116 contacting the ohmic contact layer 112 and spaced apart from each other. A data line 118 connected to the source electrode 114 is also formed. At the same time, a separate and isolated metal layer 120 for a capacitor is formed over the gate line 104

Next, a passivation layer 122 is formed entirely on the substrate 100 by coating an organic material, such as benzocyclobutene (BCB) and an acrylic resin, or by depositing an inorganic material, such as silicon nitride (SiNx) and silicon oxide ($SiO_2$). The passivation layer 122 is patterned to expose portions of the drain electrode 116 and the island-shaped metal layer 120.

Figure 6D:
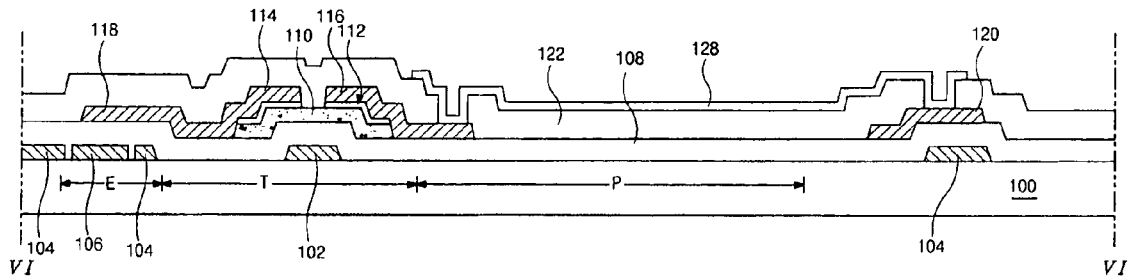

Next, as shown in FIG. 6D, a pixel electrode 128 is formed on the passivation layer 122 by depositing a transparent conductive material, such as indium-tin-oxide (ITO) and indium-zinc-oxide (IZO), and patterning the transparent conductive material. The pixel electrode 128 is connected to the drain electrode 116 and the island-shaped metal layer 120.

In the present invention, the parasitic capacitor at the crossing or overlapping point can be reduced, because the independent portion underneath the data line does not receive any electric signal. And light transmittance through the gap between the gate line and the independent portion can be reduced by making the gap to be as small as possible.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
    a substrate;
    a gate line elongated in one direction;
    a data line crossing over the gate line;
    a thin film transistor near a crossing point of the gate and data lines and connected to the gate and data lines;
    an independent portion under the data line at the crossing point, the independent portion being separate from the gate line; and
    a pixel electrode connected to the thin film transistor,
    wherein the gate line has an open portion at the crossing point, and
    wherein the independent portion is inside the open portion.

2. The array substrate according to claim 1, wherein the independent portion is inside the gate line.

3. The array substrate according to claim 1, wherein the independent portion is electrically floated and shields incident light to the thin film transistor.

4. The array substrate according to claim 1, wherein the independent portion has the same material and the same layer as the gate line.

5. The array substrate according to claim 1, further comprising a metal layer connected to the pixel electrode, wherein the metal layer overlaps the gate line to form a storage capacitor.

6. The array substrate according to claim 1, wherein the thin film transistor includes a gate electrode connected to the gate line, an active layer of intrinsic amorphous silicon, and source and drain electrodes, wherein the source electrode is connected to the data line and the drain electrode is connected to the pixel electrode.

7. The array substrate according to claim 1, wherein the pixel electrode includes one of indium-tin-oxide (ITO) and indium-zinc-oxide (IZO).

8. The array substrate according to claim 1, wherein a first width of a portion of the gate line at the crossing portion is smaller than a second width of the other portion of the gate line.

* * * * *